United States Patent

Spykerman

[11] Patent Number: 5,290,087
[45] Date of Patent: Mar. 1, 1994

[54] ARMREST WITH IMPACT DEPENDENT DIMENSION

[75] Inventor: David J. Spykerman, Holland, Mich.
[73] Assignee: Prince Corporation, Holland, Mich.
[21] Appl. No.: 963,131
[22] Filed: Oct. 19, 1992
[51] Int. Cl.$^5$ .......................... B60J 9/00; B60R 21/02
[52] U.S. Cl. ............... 296/153; 297/411.21; 297/411.32; 280/751
[58] Field of Search ............... 296/153; 297/411–413, 297/417; 280/751, 752

[56] References Cited

U.S. PATENT DOCUMENTS

| | | | |
|---|---|---|---|
| 2,624,596 | 1/1953 | Clingman . | |
| 2,922,674 | 1/1960 | Hollerbach . | |
| 3,362,749 | 1/1968 | Clement | 297/412 |
| 3,387,881 | 6/1968 | Stepanek et al. | 296/153 |
| 3,400,979 | 9/1968 | James | 297/412 |
| 3,620,566 | 11/1971 | Leconte | 296/153 |
| 3,806,154 | 4/1974 | Akiyama | 280/752 |
| 3,808,743 | 5/1974 | Renner et al. | 296/153 X |
| 3,936,090 | 2/1976 | Aya et al. | 49/502 X |
| 3,989,275 | 11/1976 | Finch et al. | 280/751 |
| 4,272,103 | 6/1981 | Schmid et al. | 280/751 |
| 4,783,114 | 11/1988 | Welch | 296/153 |
| 4,786,100 | 11/1988 | Kleemann et al. | 296/153 |
| 4,890,877 | 1/1990 | Ashtiani-Zarandi | 296/153 |
| 4,919,470 | 4/1990 | Muller | 296/153 |
| 5,040,335 | 8/1991 | Grimes | 49/502 |
| 5,048,234 | 9/1991 | Lau et al. | 49/502 |
| 5,163,730 | 11/1992 | Welch | 280/751 X |

FOREIGN PATENT DOCUMENTS

| | | | |
|---|---|---|---|
| 2104388 | 8/1972 | Fed. Rep. of Germany | 280/751 |
| 2645463 | 4/1978 | Fed. Rep. of Germany | 297/411 |
| 2070425 | 9/1981 | United Kingdom | 297/411 |

Primary Examiner—Dennis H. Pedder
Attorney, Agent, or Firm—Price, Heneveld, Copper, DeWitt & Litton

[57] ABSTRACT

A vehicle accessory such as an armrest includes a core to which there is positioned a collapsible member extending outwardly from at least one edge of the core at a side thereof and which upon receiving a lateral force in a direction toward the core, expands by collapsing and to increase its height. A cushioning material is positioned over the collapsible member which can be covered by a suitable upholstery material.

29 Claims, 1 Drawing Sheet

ARMREST WITH IMPACT DEPENDENT DIMENSION

BACKGROUND OF THE INVENTION

The present invention relates to an armrest for use in vehicles such as automobiles and one whose height varies as a function of a side impact force to provide safety to an occupant.

Armrests for use between seats in vehicles typically pivot between a raised, stored position and a lowered, use position. In many vehicles, such armrests are relatively large having a generally square cross-sectional shape such that the width of the armrest and its height are substantially the same. In modern compactly designed vehicles, it is difficult to incorporate large bulky armrests as used in larger, earlier vintage vehicles. In newer vehicles, therefore, the armrests tend to be smaller and thinner and as a result, in the event of a vehicle accident, the occupant, if accelerated laterally against the side of an armrest could be seriously injured. To prevent such injury, it is necessary for the armrest to present at least a two-inch height along a major portion of its length so that it provides protection for the vehicle occupant as required in the United States Federal Motor Vehicle Safety Standard. Accordingly armrests, even those employed in compactly designed vehicles, must have a vertical height which is sufficient to meet this safety requirement. The result in some vehicles is an ungainly appearing armrest.

Ultra-thin armrests of the type disclosed in U.S. patent application Ser. No. 07/914,791 filed on Jul. 16, 1992, and entitled ARTICULATED ARMREST provides an armrest which rotates downwardly from a generally vertical plane when in a raised, stored position to a horizontal use position in which the armrest lies in a generally horizontal plane. In this position, the edge or height dimension can be relatively thin. Also, from an aesthetic standpoint, it may be desirable to provide an armrest which has a height which is substantially less than the minimum height required by safety standards and yet provides adequate safety for the vehicle occupant.

SUMMARY OF THE PRESENT INVENTION

The vehicle accessory of the present invention provides a member with which the vehicle occupant may come into contact in the event of an accident, which expands upon receipt of an impact force to cushion the reactive force upon the vehicle occupant. When embodied in an armrest of the present invention, such structure satisfies the design needs both for an armrest which can rotate between vertical and horizontal planes as it is moved from a retracted to a use position, or relatively thin armrests which may be desirable from an aesthetic or cost standpoint. This goal is accomplished by providing an armrest having an inner support core to which there is positioned an expandable or collapsible member which extends outwardly from at least one edge of the core at a side thereof and which upon receiving a lateral force in a direction toward the core, collapses to increase its height. A cushioning material is positioned over the collapsible member, and the armrest structure so formed is covered by a suitable upholstery material.

In a preferred embodiment of the invention, the collapsible member includes a pair of arms pivotally joined at one end and coupled to the core and extending outwardly therefrom and terminating at a pivot joint at the opposite ends of the arms such that they pivot away from one another upon receipt of an impact to present an expanded height. In a preferred embodiment, the arms include an intermediate pivot hinge to facilitate the increase in height of the armrest upon receipt of impact force. Such construction, therefore, allows the vehicle designer to provide a relatively thin-profile armrest which has safety features equal to those of conventional large and bulky armrests and at a reasonable cost. These and other features, objects and advantages of the present invention will become apparent upon reading the following description thereof together with reference to the accompanying drawings in which:

DETAILED DESCRIPTION OF THE PREFERRED EMBODIMENT

Figure 1:
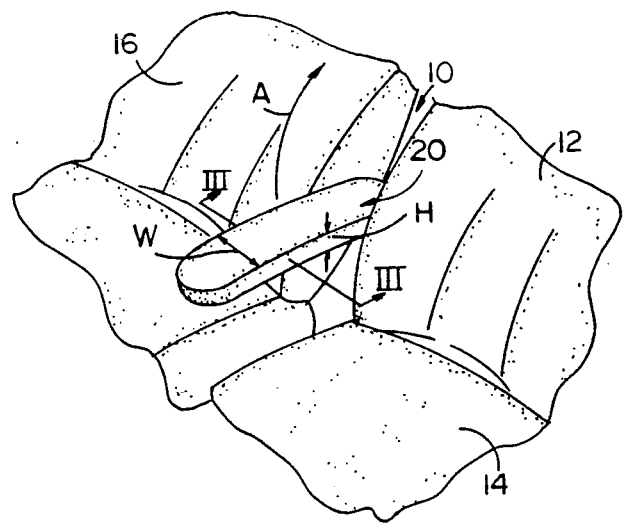
FIG. 1 is a fragmentary, perspective view of the interior of a vehicle showing a vehicle seat with an armrest embodying the present invention.

Referring initially to FIG. 1, there is shown the interior of a vehicle including the front driver's seat 10 having a seat back 12 and seat support 14. Mounted to the underlying structural support of the seat back 12 or to some other similar mounting location in a conventional manner is an armrest 20 embodying the present invention. The armrest extends between the seat 10 and a second seat 16 which may include a substantially identical armrest of mirror image construction (not shown). The armrest 20 may be mounted to the vehicle seat in the manner disclosed in the above identified patent application Ser. No. 07/914,791, the disclosure of which is incorporated herein by reference. If so mounted, the armrest 20 will rotate as it is lifted upwardly in a direction indicated by Arrow A to a raised, stored position aligned in the substantially vertical plane of the seat back 12. When lowered to a use position, as illustrated in FIG. 1, the armrest 20 presents a relatively flat and wide profile indicated by Arrow W in the Figure to provide the desired armrest support but is relatively thin as indicated by dimension Arrow H. The height H may be, for example, about one inch or less. Thus, the armrest provides an attractive appearance and allows compact storage of the armrest if one of the type which rotates when raised to a stored position. The armrest construction embodying the present invention provides a vertical height H which increases dramatically if a lateral impact is applied to the armrest as, for example, if the vehicle occupant is thrown against the armrest in the event of an accident.

Figure 2:
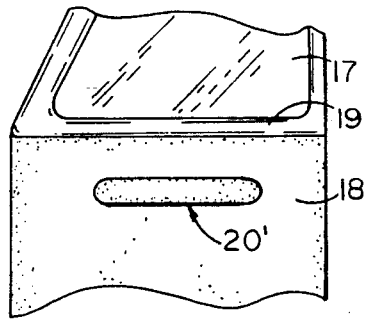
FIG. 2 is a fragmentary, front-elevational view of a vehicle door panel including an armrest embodying the present invention.

An armrest of the present invention may also be mounted to a door panel 18 of a vehicle as illustrated in FIG. 2 where an armrest 20' is mounted to the passenger side door of a vehicle which includes a window 17 and molding 19 at the usual location. Armrest 20' can be mounted to the door panel in a conventional manner but includes the same interior construction as armrest 20 to provide the height adjustable safety feature as that described in detail below in connection with FIGS. 3 and 4. Naturally, armrest 20' is somewhat shorter than the armrest 20 mounted between the vehicle seats. The construction of armrests 20 and 20' is shown in detail in FIGS. 3 and 4 which is now described.

Armrest 20 includes a generally hollow, rectangular, elongated core 22 which may be made of steel or other structurally rigid material to which a suitable mounting structure (not shown) is mounted for attaching the armrest to the vehicle seat support structure for structurally mounting the armrest to the vehicle in a conventional manner. The core 22 includes a plurality of spaced upper and lower generally rectangular slots 24 and 26 in the preferred embodiment which extend along the length of the core for receiving upper and lower spaced tabs 42 and 52 of a collapsing member 30 which extends over core 22.

The collapsing member 30 includes an upper arm 40 and a lower arm 50 which override the upper and lower surfaces 21 and 23 of core 22 and extend laterally outwardly from the occupant facing surface 25 of core 22. The upper and lower arms 40 and 50 of collapsing member 30 may be integrally joined by flanges 41 and 51 adjacent the opposite wall 27 of core 22 and seam welded or otherwise attached for holding arm ends 41 and 51 together. Arms 40 and 50 are of generally identical construction and are typically integrally molded of a polymeric material and constitute elongated members which extend along a significant length of the armrest from near the front to a position near the mounting of the armrest to the seat 10. Upper arm 41 includes a vertically extending leg 43 extending upwardly from flange 41 and integrally joined to a generally horizontally extending leg 44.

Figure 3:
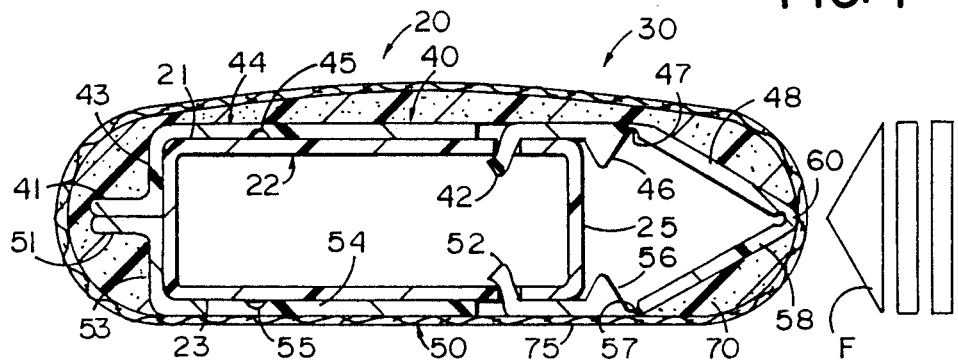
FIG. 3 is an enlarged, vertical, cross-sectional view of the armrest shown in FIG. 1 taken along section lines III—III of FIG. 1 shown in a normal use position.

At a position spaced from flange 41 toward the opposite end is an elongated, reduced thickness section of leg 44 to define a pivot hinge 45 for leg 44. A plurality of spaced locking tabs 42 are integrally formed in leg 44 and extend into slots 24 as shown in FIG. 3. Each tab 42 has a conventional arrowhead shape to collectively releasably hold leg 44 against the upper surface 21 of core 22 when the armrest is in its normal use configuration. Arm 44 extends over the top surface 21 of core 22 and terminates in a downwardly extending, generally triangular camming projection 46 which extends over the corner of core 22 and over outer surface 25 of the core. Second hinge means 47 is formed at the junction of camming projection 46 and a downwardly inclined leg 48 of upper arm structure 40 with leg 48 terminating at apex 60 defining a pivot hinge with an upwardly inclined leg 58 of lower arm 50. Arm 50 is substantially a mirror image of arm 40 and has substantially identical elements as arm 40 which are identified by the same least significant digit of the associated reference numeral. Each of the hinges 45, 47, 60, 55, and 57 is integrally formed in the resilient polymeric arms 40 and 50 by providing, as seen in the Figures, a reduced thickness area which extends longitudinally along the length of the arms to allow the arms to pivot as seen in FIG. 4.

The collapsing member 30 is, prior to assembly, a substantially elongated sleeve which is positioned over core 22 with the plurality of spaced tabs 42 and 52 then snap-fitted into the slots 24 and 26 which are spaced in core 22 to align with the tabs. The resilient polymeric material forming collapsing member 30 can be polyvinylchloride, polyethylene, or any other suitable generally resilient polymeric material which can be molded to include the integral hinges 45, 55, 47, 57 and 60.

Figure 4:
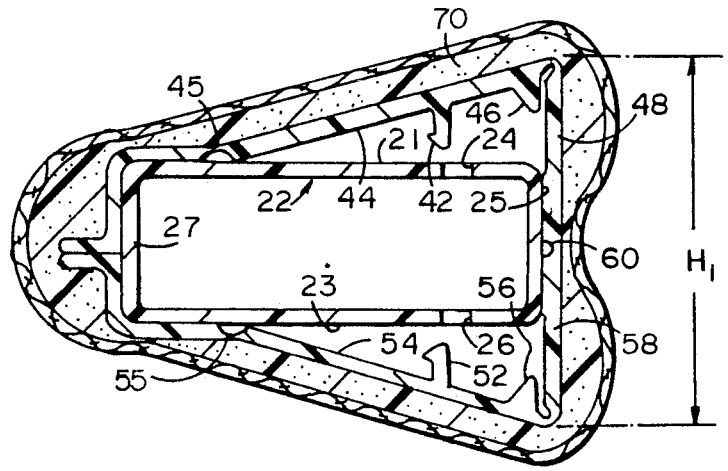
FIG. 4 is an enlarged, vertical, cross-sectional view of the armrest shown in FIG. 3 shown upon application of a side impact force.

As seen in FIG. 4, when a lateral force is applied to the armrest 20, as represented by Arrow F in FIG. 3, the upper and lower arms 40 and 50 pivot at hinges 45 and 55 away from one another and the core and the inclined legs 48 and 58 move under the influence of the camming action of the inclined surfaces of camming projections 46 and 56 engaging the upper and lower corners of the core 22. Inclined legs 48 and 58 become generally vertical as shown in FIG. 4 as the collapsing member 30 collapses in response to the impact force F. The hinges 47 and 57 allow the inclined legs 48 and 58 to move to a vertical position while hinge 60 allows the legs 48 and 58 to spread open to a generally planar position presenting an increased height H1 (FIG. 4) over the height H shown in FIG. 1. This height is approximately twice that of the original height of the armrest and at least two inches to provide an impact resistant cushion surface for providing protection to the vehicle occupant.

The collapsing member 30 and entire armrest are covered with a suitable open or closed cell foam cushion material 70 which can be molded over the core and collapsing member once assembled or can be in the form of a sleeve into which the subassembly is inserted. Extending over the cushion material 70 is a suitable upholstery material 75 which can be a foam-backed fabric, leather, vinyl or any other suitable upholstery material to conform the vehicle armrest to the interior appearance of the vehicle.

Armrest 20 thus provides a relatively low profile, wide and therefore comfortable armrest which can easily be stored if utilizing a mount of rotational construction for the two axis rotation of the armrest in its movement between stored and use positions, while at the same time providing a relatively thick armrest for safety in response to a lateral impact force. Tabs 42 and 52 are formed such that although snugly fitting into the slots 24 and 26, they will break away from the slots as shown in FIG. 4 upon an impact force and allow the legs 44 and 54 to pivot away from one another as seen. After an impact force, the legs 44 and 54 can be snap-fitted into the aperture or slots 24 and 26 by squeezing on the upper and lower surfaces of the armrest with the inclined arrowhead-shaped ends of the tabs camming the tabs into the respective aligned slots.

Thus, the armrest is capable of multiple impacts; however, it can be designed such that it only withstands a predetermined impact, and the tabs can be designed such that they break away upon impact, and it is necessary to replace the armrest if a serious lateral impact is encountered. The armrest construction 20 shown in FIGS. 3 and 4 is also employed for the armrest 20' shown in FIG. 2 with the only difference being the length of the core and collapsing member and associated cushioning upholstery material and the particular conventional fastening means for attaching the core 22 to the side of door panel 18.

It will become apparent to those skilled in the art that these and various other modifications to the preferred embodiments of the invention can be made without departing from the spirit or scope thereof as defined by the appended claims.

The embodiments of the invention in which an exclusive property or privilege is claimed are defined as follows.

1. An armrest for a vehicle comprising:

a core member defining an armrest having a first predetermined height; and arm means movably coupled to said core member and including cam means engaging said core member in response to an impact force thereby moving said arms means for increasing the first predetermined height of said armrest in response to an impact force.

2. An armrest for a vehicle comprising:

a core defining an armrest having a predetermined length, width, and height;

collapsing means coupled to said core for changing dimension in response to an impact force for increasing the predetermined height of said armrest in response to an impact force wherein said collapsing means includes at least one arm pivotally coupled to said core and having cam means engaging said core for moving said arm in response to an impact force.

3. The armrest as defined in claim 2 wherein said arm of said collapsing means includes an inclined leg extending over one side of said core, and wherein said cam means is located on said arm at a corner of said core.

4. The armrest as defined in claim 3 wherein said arm includes a horizontally extending leg overlying said core and means for releasably coupling said leg to said core.

5. The armrest as defined in claim 4 wherein said collapsing means includes a second arm pivotally coupled to said one arm at an end proximate said one side of said core.

6. The armrest as defined in claim 5 wherein said one and second arms each include said cam means at a corner of said core and further include hinge means adjacent said cam means on a side of said cam means opposite said core to allow said inclined legs of said one and second arms to pivot from an inclined position angled with respect to one another to a position aligned in a plane generally orthogonal to the plane of said horizontally extending leg of said one arm.

7. The armrest as defined in claim 6 wherein said one and second arms are integrally molded of a resilient polymeric material.

8. The armrest as defined in claim 7 wherein said second arm includes a generally horizontally extending leg and means for releasably attaching said leg to said core on a side opposite said one arm.

9. The armrest as defined in claim 8 wherein said means for releasably attaching said generally horizontally extending legs comprises a plurality of spaced tabs extending from each of said legs toward said core and a plurality of spaced slots formed in said core and aligned with said tabs for releasably holding said tabs therein.

10. The armrest as defined in claim 9 and further including padding means extending over said core and said one and second arms.

11. An armrest for a vehicle comprising:

a core having a generally rectangular cross section including a top, bottom, and sides to form a low profile, relatively thin armrest;

means including a pair of spaced arms coupled to said core and to each other and extending to at least one of said sides of said core for providing a first side dimension for the armrest when in use, said arms movable toward said at least one side in response to an impact force applied to said armrest for providing a second side dimension greater than said first side dimension in response to an impact force wherein said spaced arms include convergent legs at one end spaced from said one side of said core and said ends of said convergent legs are hinged together; and wherein each of said convergent legs of said spaced arms further include cam means immediately adjacent a corner of said core for urging said convergent legs to a coplanar position in response to an impact force applied to said one side of said armrest.

12. The armrest as defined in claim 11 wherein said convergent legs further include hinge means immediately adjacent said cam means on a side of said cam means remote from said core.

13. The armrest as defined in claim 12 wherein said cam means comprises an inwardly extending, angled projection which urges said convergent legs away from said core in response to an impact force on said one side of said armrest.

14. The armrest as defined in claim 13 and further including a pair of spaced, generally horizontally extending legs lying over opposite surfaces of said core with one of said horizontally extending legs integral with an associated one of said convergent legs.

15. The armrest as defined in claim 14 including means for pivotally mounting said horizontally extending legs to said core.

16. The armrest as defined in claim 15 and further including means for releasably holding said horizontally extending legs to said core in an area near said cam means.

17. The armrest as defined in claim 16 wherein said means for releasably holding said horizontally extending legs comprises a plurality of tabs on each of said legs, said tabs extending toward said core and a plurality of slots formed in said core and aligned with said tabs for releasably holding said tabs.

18. The armrest as defined in claim 17 wherein said spaced arms are made of a resilient polymeric material.

19. A cushioned vehicle accessory having a profile with a thin edge positioned where it can be engaged by an occupant, said accessory comprising:

a core member having an edge facing the interior of a vehicle with a dimension of less than about two inches;

expanding means coupled to said core member and extending to at least one side of said core member facing a vehicle occupant when said accessory is mounted in a vehicle for providing a first edge dimension for the accessory when in use, said means expanding in response to an impact force applied to said one side of said core for providing a second edge dimension greater than said first edge dimension in response to an impact force said expanding means including at least one arm movably mounted to said core member, said arm including cam means engaging said core for moving said at least one arm to provide said second edge dimension in response to an impact force; and means for covering said core member and said at least one arm.

20. The accessory as defined in claim 19 wherein said expanding means includes at least a pair of spaced arms which are hinged to each other.

21. The accessory as defined in claim 20 wherein said spaced arms include convergent legs at one end spaced from said one side of said core member and hinge means coupling said ends of said inclined legs.

22. A cushioned vehicle accessory having a profile with a thin edge positioned where it can be engaged by an occupant, said accessory comprising:

a core having a generally rectangular cross section with a top, bottom, and at least one side, said core having a height less than about two inches;

expanding means coupled to said core member and extending to at least one side of said core facing a vehicle occupant when said accessory is mounted in a vehicle for providing a first side dimension for the accessory when in use, said means expanding in response to an impact force applied to said one side of said core for providing a second side dimension greater than said first side dimension in response to an impact force wherein said expanding means includes at least a pair of spaced arms which are hinged to each other, and wherein said spaced arms include convergent legs at one end spaced from said at least one side of said core and hinge means coupling said ends of said convergent legs; and wherein each of said convergent legs of said spaced arms further includes cam means immediately adjacent a corner of said core for urging said convergent legs to a coplanar position in response to an impact force applied to said at least one side of said accessory.

23. The accessory as defined in claim 22 wherein said convergent legs further include additional hinge means immediately adjacent said cam means on a side of said cam means remote from said core.

24. The accessory as defined in claim 23 wherein said cam means comprises an inwardly extending, angled projection which urges said convergent legs away from said core in response to an impact force on said one side of said accessory.

25. The accessory as defined in claim 24 and further including a pair of spaced, generally horizontally extending legs lying respectively on said top and bottom with one of said horizontally extending legs integral with an associated one of said convergent legs.

26. The accessory as defined in claim 25 including means for pivotally mounting said horizontally extending legs to said core.

27. The accessory as defined in claim 26 and further including means for releasably holding said horizontally extending legs to said core in an area near said cam means.

28. The accessory as defined in claim 27 wherein said means for releasably holding said horizontally extending legs comprises a plurality of tabs on each of said legs, said tabs extending toward said core and a plurality of slots formed in said core and aligned with said tabs for releasably holding said tabs.

29. The accessory as defined in claim 28 wherein said spaced arms are made of a resilient polymeric material.

* * * * *

UNITED STATES PATENT AND TRADEMARK OFFICE
CERTIFICATE OF CORRECTION

PATENT NO. : 5,290,087
DATED : March 1, 1994
INVENTOR(S) : David J. Spykerman

It is certified that error appears in the above-indentified patent and that said Letters Patent is hereby corrected as shown below:

Column 7, line 7, claim 22
After "core" delete --member--; and

Column 8, line 10, claim 25
After "bottom" insert --of said core--.

Signed and Sealed this

First Day of November, 1994

Attest:

BRUCE LEHMAN

Attesting Officer

Commissioner of Patents and Trademarks